F. H. SMITH.

Improvement in the Manufacture of Tension Eye-Bars for Bridges.

No. 128,184.  Patented June 18, 1872.

Witnesses.
C. B. Nottingham
Thomas C. Smith

Inventor.
Frederick H. Smith
by his attorney
A. Pollok

UNITED STATES PATENT OFFICE.

FREDERICK H. SMITH, OF BALTIMORE, MARYLAND.

IMPROVEMENT IN THE MANUFACTURE OF TENSION EYE-BARS FOR BRIDGES.

Specification forming part of Letters Patent No. 128,184, dated June 18, 1872.

*To whom it may concern:*

Be it known that I, FREDERICK H. SMITH, of Baltimore, in the county of Baltimore and State of Maryland, have invented certain new and useful Improvements in Tension Eye-Bars for Bridges and other engineering purposes, of which the following is a specification:

Metallic eye-bars generally in use for the purposes set forth have generally been made in one of two ways: First, by welding the heads in which the eyes are formed onto the bar, and, second, by upsetting the bar in order to form the heads of the parts upset. Both of these modes are objectionable for the reason that flaws frequently occur in the weld or upset which cannot be discovered, and yet impair most seriously the strength of the bars. The testing-machine which may be employed to determine the strength of the bars is but a partial safeguard, for in a long bar a flaw in a weld or upset extends over so small a proportion of the total length that the bar will show no appreciable permanent set from the test, while it may have been upon the point of rupturing. In welded or upset bars there is always this uncertainty to their strength; and, moreover, both the welding and upsetting operations require the bar to be reheated after it has been rolled.

To remedy these defects is the object of my invention; which consists in a new manufacture of tension eye-bars, together with the heads at the ends thereof, and whereby the upsetting or welding is dispensed with, substantially as hereinafter described.

To enable others to make and use my said invention, I shall now describe the manner in which the same is or may be performed.

Figure 1:
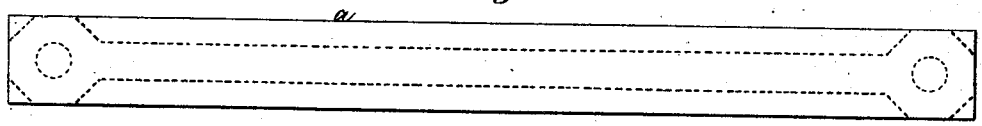
Figure 2:
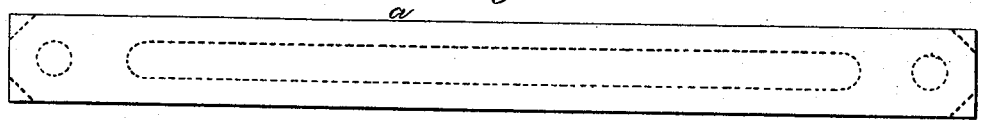
Figure 3:
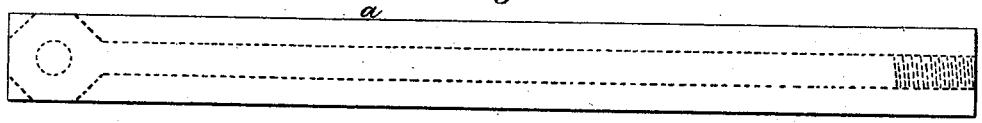

I take a plate of iron or steel, or iron and steel, having the requisite length, width, and thickness for the bar, as shown at $a$, Figs. 1, 2, 3. This plate I cut, by means of a ribbon-saw or circular saw, into the shape of a tension-bar, such as the double-headed bar indicated by the dotted lines in Figs. 1 and 2 or the single-headed bar indicated in a like manner in Fig. 3. I then drill the eyes in the head or heads, and thus complete the bar. Experiments, however, have demonstrated that this mode of making eye-bars by the sawing process, although practicable, is not economical, by any means yet invented. I have ascertained, after many trials, that, in lieu of the sawing process, I can produce the bar more readily and economically by planing or slotting. The plate such as above described and shown in the drawing is subjected to the action of the planer, and is then cut out in either of the forms of eye-bar represented by dotted lines in the several figures.

Figure 4:
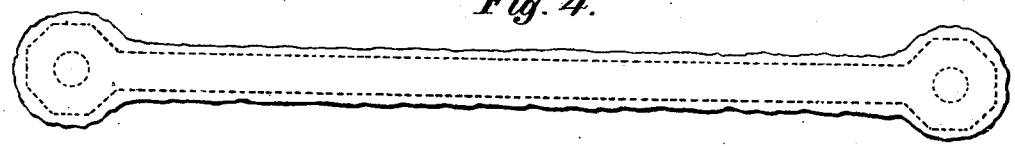
Figure 5:
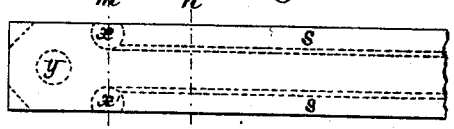

In Figs. 5, 6, 7, and 8 I have shown the manner in which this is done in the most economical manner for tension-bars such as shown in Figs. 1 and 4. A plate of the requisite length, width, and thickness is first drilled at $x$ and $x'$, Fig. 5, so as to cut out a semi-cylinder more or less according to the width of the bar. Similar semi-cylinders are cut out of the thickness of the plate at the opposite end of the plate and at like distance from that extremity. The plate is then placed on the bed of the planer and a narrow planing-tool is caused to travel from one hole $x$ to the other at the opposite end, the groove so cut being tangential to the cylindrical surface at $x$. The planer repeats the action, deepening the groove until the outside pieces $s$ become detached.

Figure 6:

In Fig. 6, I have shown in section on line $m$ the two semi-cylindrical notches having between them a portion of the plate, which represents the width and thickness of the bar between the heads. The section on line $n$ shows the action of the planer at two different stages of its operation. On the left-hand side the planer, after several travels along the plate, has cut the groove almost to the whole depth of the plate, while on the right-hand side the planer has just commenced to cut the groove. I prefer, however, to adjust the planers in pairs, so as to cut the two grooves simultaneously. To finish the eye-bar the eye $y$ is cut in the unreduced portion of the plate, and the head is otherwise finished by means ordinarily used.

Figure 7:
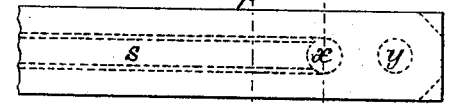

In Fig. 7 I have shown part of a slotted eye-bar and indicated in dotted lines the path the planer is to travel between a single hole, $x$, cut out at each end of the plate and at like distances from its respective extremities.

Figure 8:
Figure 8:
Figure 8:

Fig. 8 shows a sectional view on line $o$ and another sectional view on line $p$. In this case the piece $s$ which becomes detached is between the two planer-cuts. There are other ways of shaping eye-bars by means of planers. Thus a number of plates—say from twenty to thirty—may be set up in juxtaposition and the planer may be caused to travel and to cut transversely; but such use of the planer would be productive of much waste of time and material, as the operation would be necessarily slow. The side pieces S, which would command a good price in the market, would be wasted in shavings, which could not be used except for being reworked again into plate or bar iron and for other purposes.

The above modes of cutting the bars are the only ones which I have found feasible, as the cutting them out by punching, stamping, or shearing processes would not only be impracticable, owing to the length and dimensions of the bar, but would be most injurious to the metal, as any violent action of the kind weakens the fiber of the finished bar and renders the scrap less valuable.

I prefer to make the plate $a$ from a pile of such composition, size, and dimensions as required to produce a bar of the quality, weight, and length desired. The tension-bar shown in Fig. 1 can be made with less resultant scrap from a double-headed pile shown in Fig. 4 rolled down between boiler-plate rolls, leaving only rough edges to be taken off in order to form the finished eye-bar. I prefer, however, to make the bars from square-edged iron, as scrap from such iron is in the market worth quoted rates for bar, while the rough-edged pile yields scrap of less value. The bar shown in Fig. 2 can be made economically and quickly by the means above described.

What I claim, and desire to secure by Letters Patent, is—

1. The manufacture of weldless tension eye-bars for bridges and other engineering purposes by planing or sawing, substantially as and for the purposes herein set forth.

2. Eye-bars for bridges and similar purposes, as a new article of manufacture, when made substantially as herein described.

In testimony whereof I have signed my name to this specification before two subscribing witnesses.

FREDERICK H. SMITH.

Witnesses:
  G. E. SANGSTER,
  H. MURRAY HANAN.